US008254724B2

(12) United States Patent
Allred

(10) Patent No.: US 8,254,724 B2
(45) Date of Patent: Aug. 28, 2012

(54) METHOD AND APPARATUS FOR MAKING AND PROCESSING ABERRATION MEASUREMENTS

(75) Inventor: Lloyd G. Allred, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 934 days.

(21) Appl. No.: 12/266,019

(22) Filed: Nov. 6, 2008

(65) Prior Publication Data
US 2010/0111421 A1 May 6, 2010

(51) Int. Cl.
G06K 9/36 (2006.01)
G06K 9/46 (2006.01)
(52) U.S. Cl. ........................................ 382/288; 382/201
(58) Field of Classification Search .................. 382/288
See application file for complete search history.

(56) References Cited

U.S. PATENT DOCUMENTS

| 4,029,396 | A | 6/1977 | Shenker |
| 4,190,332 | A | 2/1980 | Body |
| 4,471,448 | A | 9/1984 | Williams |
| 4,490,039 | A | 12/1984 | Bruckler |
| 5,062,702 | A | 11/1991 | Bille |
| 5,382,988 | A | 1/1995 | Nanjo |
| 5,504,543 | A | 4/1996 | Ueno |
| 5,523,809 | A | 6/1996 | Kohayakawa |
| 5,537,163 | A | 7/1996 | Ueno |
| 5,684,561 | A | 11/1997 | Yancey |
| 5,777,719 | A | 7/1998 | Williams |
| 5,891,132 | A | 4/1999 | Hohla |
| 5,949,521 | A | 9/1999 | Williams |
| 5,963,300 | A | 10/1999 | Horwitz |
| 6,042,233 | A | 3/2000 | Mihashi |
| 6,086,204 | A | 7/2000 | Magnante |
| 6,130,419 | A | 10/2000 | Neal |
| 6,155,684 | A | 12/2000 | Bille |
| 6,199,986 | B1 | 3/2001 | Williams |
| 6,234,978 | B1 | 5/2001 | Mihashi |
| 6,264,328 | B1 | 7/2001 | Williams |
| 6,271,914 | B1 | 8/2001 | Frey |
| 6,271,915 | B1 | 8/2001 | Frey |

(Continued)

FOREIGN PATENT DOCUMENTS
DE 42 22 395 A 1/1994
(Continued)

OTHER PUBLICATIONS

Huilun Lin, Chunhong Wang, and Wenhan Jiang: "The universal formula computing the position of subaperture spot image for Shack-Hartmann wavefront sensor" Proc. Spie: Adaptive Optics and Applications III, vol. 5639, 2004, pp. 205-211.

(Continued)

Primary Examiner — David Zarka
(74) Attorney, Agent, or Firm — Jeffrey B. Powers

(57) ABSTRACT

A method for determining a centroid coordinate of an image spot, comprising a) determining a search region having a border, b) identifying a first pixel in the search region, the pixel having a first intensity value, c) determining an upper threshold intensity value greater than the first intensity value, d) searching for a second pixel within the search region having an intensity value that is greater than the upper threshold intensity value, and e) upon finding the second pixel, designating the first pixel an integration region center.

8 Claims, 5 Drawing Sheets

U.S. PATENT DOCUMENTS

| | | |
|---|---|---|
| 6,299,311 B1 | 10/2001 | Williams |
| 6,304,723 B1 | 10/2001 | Kohayakawa |
| 6,460,997 B1 | 10/2002 | Frey |
| 6,497,483 B2 | 12/2002 | Frey |
| 6,511,180 B2 | 1/2003 | Guirao |
| 6,550,917 B1 | 4/2003 | Neal |
| 6,598,973 B2 | 7/2003 | Campin |
| 6,649,895 B1 | 11/2003 | Wirth |
| 6,656,209 B1 | 12/2003 | Campin |
| 6,736,509 B2 | 5/2004 | Altmann |
| 6,739,721 B2 | 5/2004 | Martino |
| 6,827,444 B2 | 12/2004 | Williams |
| 6,845,177 B2* | 1/2005 | Chiu ............................ 382/199 |
| 6,856,314 B2* | 2/2005 | Ng ............................... 345/421 |
| 7,036,934 B1 | 5/2006 | Youssefi |
| 7,044,603 B2 | 5/2006 | Yoon |
| 7,171,393 B2* | 1/2007 | Naveh ............................ 706/19 |
| 7,335,867 B2 | 2/2008 | Topa |
| 2002/0097376 A1* | 7/2002 | Applegate et al. ............ 351/205 |
| 2002/0118340 A1 | 8/2002 | Campin |
| 2003/0086063 A1 | 5/2003 | Williams |
| 2003/0142271 A1 | 7/2003 | Ross |
| 2004/0264807 A1* | 12/2004 | Yakhini et al. ................ 382/289 |
| 2005/0096528 A1* | 5/2005 | Fritz et al. .................... 600/407 |
| 2006/0126019 A1 | 6/2006 | Liang |
| 2006/0210146 A1* | 9/2006 | Gu ................................ 382/154 |
| 2007/0008491 A1 | 1/2007 | Polland |
| 2007/0036397 A1* | 2/2007 | Hamza .......................... 382/117 |
| 2008/0075335 A1* | 3/2008 | Martin et al. ................. 382/117 |
| 2008/0273763 A1* | 11/2008 | Martin et al. ................. 382/117 |

FOREIGN PATENT DOCUMENTS

| | | |
|---|---|---|
| EP | 0 910 984 A | 4/1999 |
| JP | 11 137522 A | 5/1999 |
| WO | WO 93/14470 A1 | 7/1993 |
| WO | WO 93/24048 A | 12/1993 |
| WO | WO 96/00031 A1 | 1/1996 |
| WO | WO 99/27334 A1 | 6/1999 |
| WO | WO 01/28476 A1 | 4/2001 |

OTHER PUBLICATIONS

Luis Alberto Carvalho: "A simple and effective algorithm for detection of arbitrary Hartmann Shack patterns" Journal of Biomedical Informatics, vol. 37, No. 1, 2004, pp. 1-8.

Hofer H et al: "Dynamics of the Eye's Wave Aberration" Journal of the Optical Society of America, Optics and Imagescience, Optical Society of America, vol. 18, No. 3, Mar. 1, 2001, pp. 497-506.

Liang J et al: "Objective Measurement of Wave Aberrations of the Human Eye with the Use of a Hartmann-Shack Wave-front Sensor" Journal of the optical Society of America, vol. 11, No. 7, Jul. 1, 1994.

Liang J et al: "Aberrations and Retinal Image quality of the Normal Human Eye" Journal of the Optical Society of America, vol. 14, No. 11, Jan. 1, 1997, pp. 2873-2883.

International Search Report (PCTISA/210) and Written Opinion (PCT/ISA/237) mailed on Nov. 6, 2009.

Witthoft, C., *Wavefront Sensor Noise Reduction and Dynamic Range Expansion by means of Optical Image Intensification*, Optical Engineering, Soc. of Photo-Optical Instrumentation Engineers, vol. 29, No. 10, Oct. 1990, pp. 1233-1238.

Liang, et al, *Aberrations and retinal image quality of the normal human eye*, Journal of the Optical Society of America, vol. 14, No. 11, Nov. 1997, pp. 2873-2883.

Weeks, Arthur R., Jr., *Transforms Used in Electronic Image Processing*, p. 71 *and Spatial Filtering*, p. 129-144, Fundamentals of Electronic Image Processing (SPIE/IEEE Series on Imaging Science and Engineering) (1996).

Johnsonbaugh, et al., *Chapter 7: Processing Waveforms and Images*, Pattern Recognition and Image Analysis, Prentice Hall PTR, pp. 293-296, 308 (1996).

Liang et al., *Objective Measurement of Wave Aberrations of the human eye with the use of a Hartmann-Shack wave-front sensor*, J. Opt. Soc. Am. A., vol. 11, No. 7, pp. 1949-1957 (Jul. 1994).

\* cited by examiner

FIG. 1B Band Pass

FIG. 1A Original

US 8,254,724 B2

METHOD AND APPARATUS FOR MAKING AND PROCESSING ABERRATION MEASUREMENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

Embodiments of the invention relate to methods and apparatus generally directed to the field of image processing and optical aberration measurement and characterization. More particularly, embodiments of the invention relate to methods and apparatus directed to acquiring and processing image data generated by an optical aberration measurement apparatus that utilizes a lenslet array for providing wavefront aberration data.

2. Background Art

The accurate measurement of higher-order wavefront aberrations is crucial in the fields of astronomy and ophthalmology. In astronomical applications, the intervening atmosphere between the object and the measuring device distorts the light that forms the image of the object. The ability to measure the distortion (aberrations) allows for compensation correction of the imaging system to produce a well defined image.

In an ocular system, light from an object gets distorted by the cornea and crystalline lens on its path to the retina where the image is formed. The ability to measure the ocular aberrations makes it possible to correct the image forming system through surgery and/or corrective lens fabrication. Ultra-accurate aberration measurement and correction has provided super-normal vision to many individuals.

Although various types of aberration measurement apparatus (hereinafter, "aberrometer") are known, Hartmann-Shack type aberrometers are widely used in commercial ophthalmic applications. In a Hartmann-Shack type device, a beam of light from a laser diode or other light source is directed toward the pupil and is incident on the retina. The aberrated light exiting the pupil is applied to a Hartmann-Shack sensor, which includes an array of lenslets that form an array of aerial image spots and focus the spots onto a detector. The location of each detected image spot relative to its position in the absence of wavefront aberrations provides data that is used to reconstruct the wavefront and thus detect the aberrations.

A seminal reference in the field of ophthalmic wavefront detection is Liang et al., *Objective measurement of wave aberrations of the human eye with the use of a Hartmann-Shack wave-front sensor*, Journal of the Optical Society of America, Vol. 11, No. 7, pp. 1-9 (July 1994), the disclosure of which is hereby incorporated by reference in its entirety. Improvements to the technique of Liang et al., id., are taught in Liang and Williams, *Aberrations and retinal image quality of the normal human eye*, Journal of the Optical Society of America, Vol. 4, No. 11, pp. 2873-2883 (November 1997), and in Williams et al. U.S. Pat. No. 5,777,719, the disclosures of which are hereby incorporated by reference in their entireties.

The ability to accurately measure higher-order aberrations and use the measurement information in corrective applications critically depends, in turn, on the ability to precisely determine the location of the detected image spots as well as their displacement. However, many known factors operate to frustrate improved and consistent measurement precision and accuracy. For example, scattered light can form ghost images and/or create background noise on the detector that interferes with actual image spot detection. Image processing techniques that employ high band-pass filtering or certain linear filters may create significant edge distortion and/or may radically alter the size and shape of a feature of the image. Other problems may be that one or more image spots that should be formed in the Hartmann-Shack detector cannot be seen because the aberrations may be too large (a scar, surface flaw, or keratoconus, for example, may displace or deform the spot so much that the spot's origin (centroid) cannot be determined, or the spot leaves the field of view of the detector altogether); or, they are occluded by the subject's eyelid, ocular opacities, or a host of other reasons. Typical aberrometers are also plagued by artifacts caused by internal reflections from inside the instrument, particularly from the faces of the internal reflective mirrors. Furthermore, the subject's myopia or hyperopia (lower-order defocus aberrations), if not properly corrected, may overwhelm the dynamic range of the Hartmann-Shack sensor and prevent the detection of some or all image spots.

Even if the image spots are detected, centroid calculation algorithms may provide inaccurate results. The traditional centroid calculation algorithm is derived from basic calculus. Center coordinates $c_x$, $c_y$ of a region R of an image spot are calculated by summation of weighted values of the incident light intensity $I(x_i, y_i)$ at points $(x_i, y_i)$ in R. However, there are several pitfalls in the traditional application of the standard centroid calculation algorithm. For example, a) if an integration region is not centered around the central point, then the computed center will tend toward the direction of miscentering. This problem is aggravated by increasing background scatter noise; b) if more than one spot, or the reflection of a spot, is included in the calculation, then the computation will yield a center somewhere between the two spots, which will be erroneous; c) if the integration region is insufficiently large, then the calculation will have lowered precision; d) due to problematic multiple peaks in the image, traditional approaches assume that the spot center will be found in a given region. These algorithms fail for pathological eyes with severe aberrations.

Indeed, the inability to precisely and accurately detect the image spots frustrates the computation of the wave aberration and subsequent applications that rely upon those computations.

BRIEF SUMMARY OF THE INVENTION

An aspect of the invention is directed to a method for determining a centroid coordinate of an image spot, comprising a) determining a search region having a border, b) identifying a first pixel in the search region, the pixel having a first intensity value, c) determining an upper threshold intensity value greater than the first intensity value, d) searching for a second pixel within the search region having an intensity value that is greater than the upper threshold intensity value; and e) upon finding the second pixel, designating the first pixel an integration region center.

In some embodiments, the method further comprises a step f) determining a lower threshold intensity value less than the first intensity value, and wherein step (e) is performed only if at least one intensity values between the first pixel and the second pixel is less than the lower threshold intensity value.

In some embodiments, the method further comprises identifying a radius, r, of the integration region equal to a distance between the first pixel to the second pixel.

In some embodiments, provided that none of the intensity values between the first pixel and the second pixel is less than the lower threshold intensity value, the second pixel is designated as the first pixel having a first intensity value and repeating steps (c)-(f).

In some embodiments, provided that no pixel within the search region has an intensity value that is greater than the upper threshold intensity value, the first pixel is designated an integration region center, and further comprising identifying a radius, r, of the integration region equal to the distance from the first pixel to the boundary.

Yet another aspect of the invention is directed to a system for measuring an ocular aberration, comprising an aberrometer including a lenslet component for forming an image containing an array of image spots, a sensor positioned to detect the image spot array, a processor component including executable software that provides an instruction for determining a centroid coordinate of each of said image spots, wherein the instruction comprises a) determining a search region having a border, b) identifying a first pixel in the search region, the pixel having a first intensity value, c) determining an upper threshold intensity value greater than the first intensity value, d) searching for a second pixel within the search region having an intensity value that is greater than the upper threshold intensity value, and e) upon finding the second pixel, designating the first pixel an integration region center.

DETAILED DESCRIPTION OF THE INVENTION

Exemplary embodiments of the invention are directed to methods and apparatus for measuring ocular wavefront aberrations derived from an array of image spots formed by an image array forming component (e.g., lenslet array) of a wavefront sensor.

Figure 1:
FIGS. 1a and 1b illustrate an exemplary array of image spots produced by the lenslet array of a Shack-Hartman aberrometer, without filtering and after processing with a high bandpass filter, respectively.

FIGS. 1a and 1b illustrate an exemplary array of image spots produced by the lenslet array of a Shack-Hartman aberrometer, a) without filtering, and b) after processing with a high bandpass filter, respectively. The figures illustrate that the images are afflicted by scatter noise, ghosting, and energy smearing even with various filter techniques, all of which contribute to the difficulty in accurately determining the centroid coordinates of each spot.

Figure 2:
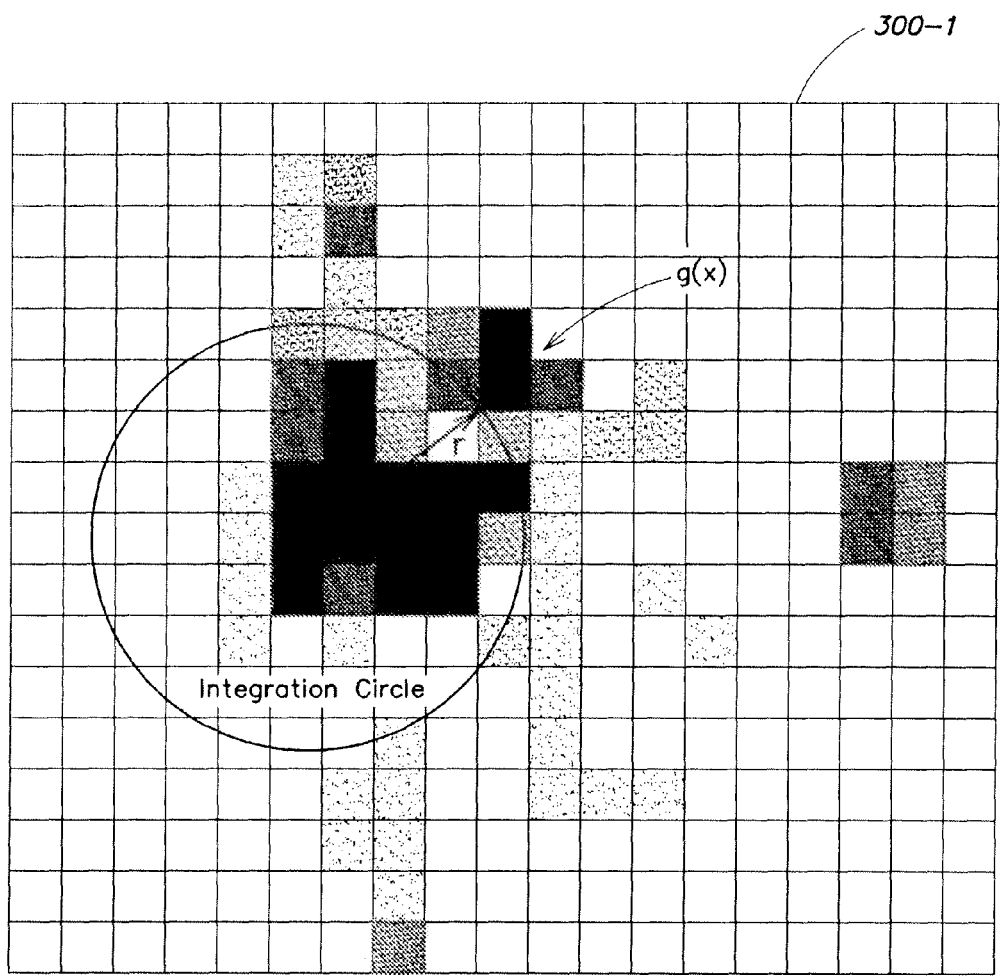
FIG. 2 is a magnified and filtered digital image copy of an image spot showing a ghost spot (x) and an integration region having a radius (r) according to an embodiment of the invention.

FIG. 2 shows an illustrative digital grey scale image 300-1 of an image spot from a lenslet of a lenslet array. The dark pixel at the origin of the arrow r represents a peak intensity of the image spot. A ghost spot (x) is identified by the less dark pixel located at the arrowed-end of the arrow r. Such an intensity distribution can cause erroneous centroid calculations as illustrated below due to the presence of a ghost spot.

Figure 3:
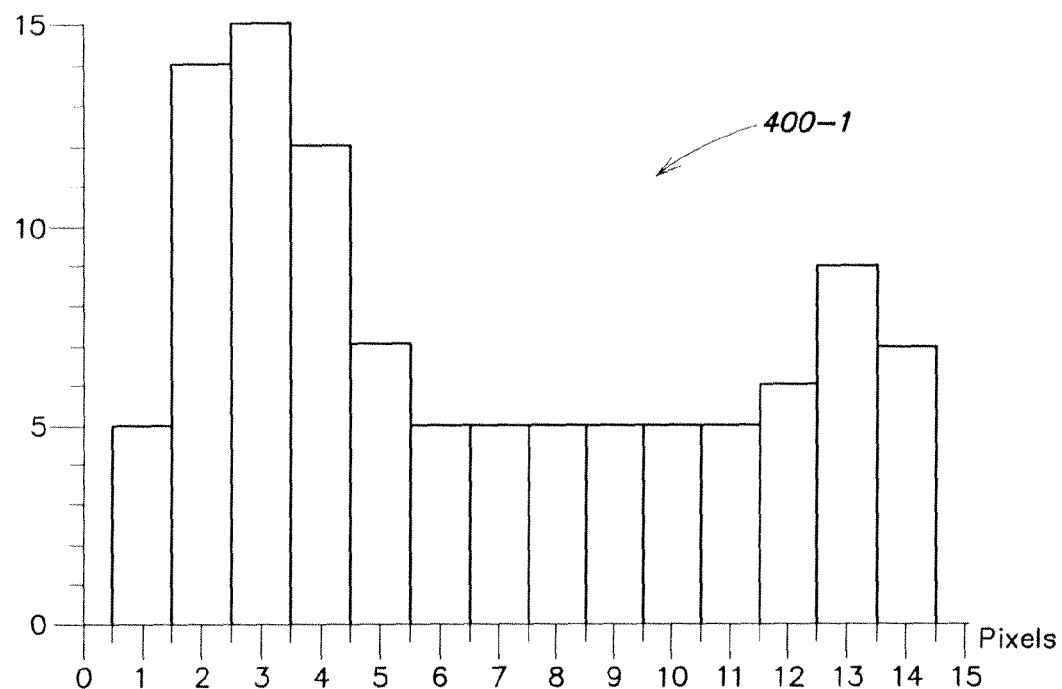
FIG. 3 is a bar chart showing raw centroid calculations for a one-lenslet according to an exemplary aspect of the invention.

FIG. 3 shows a bar graph 400-1 of intensity (I) vs. pixel count for an illustrative one-dimensional centroid calculation (for simplicity of illustration) in which a conventional centroid calculation was made as described herein above. The technique disclosed below can readily be applied to a two-dimensional analysis as one skilled in the art will appreciate. According to the figure, an accurate centroid calculation (i.e., one exclusive of the ghost spot) would identify the centroid at about pixel 3. However, a raw centroid calculation returned a value about pixel 6.5, resulting in a calculation error of about four pixels.

Figure 4:
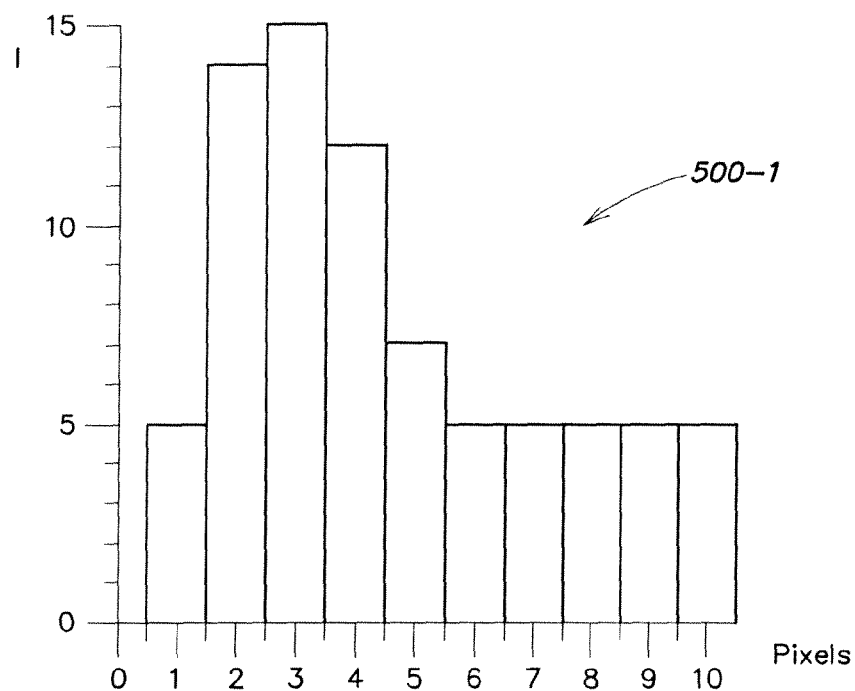
FIG. 4 is a bar chart as shown in FIG. 3 in which data from the region of the ghost spot (x) is eliminated, according to an illustrative aspect of the invention.

FIG. 4 shows a bar graph 500-1 that is similar to that in FIG. 3, except that the region is restricted to exclude information from the ghost spot appearing on the right side of FIG. 2 using the centroiding technique according to embodiments of the invention described herein below. The centroid estimate improved from about 6.5 to pixel 4.5. Note that if the integration region for the centroid calculation is centered about the peak, the conventional centroid calculation (for FIG. 2) yields the correct estimate for the centroid, about 3.0. However, the peak value will not always identify the center of the spot, as some spots may have several peak values.

In an example of a method for calculating a centroid coordinate of an image spot according to aspects of the present invention, a local search region (i.e., an area) is determined that includes an image spot. The local search region can be established using a fraction of average spot spacing. For example, an average spot spacing in the image can be calculated as described above. In some embodiments, the local search region will have a boundary dimension (e.g., a radius) equal to or less than the average spot spacing. An advantageous value for the local search region will be about 0.8 of the linear x- and y-dimensions of the average spot spacing. For example, if the average distance between spots is 20×20 pixels (average spot spacing equal to 20 pixels), then the local search region dimensions will be about 16×16 pixels. This becomes convenient where edge effects may disrupt the identification of local peak intensity values.

After a search region is identified, an appropriate threshold intensity value is determined. The method then searches for a first local peak intensity value within the local search region that is greater than the threshold intensity value. For example, the threshold intensity value may be equal to the intensity value of the pixel at the center of the search region. In some embodiments, the threshold value is equal to the intensity value of the pixel at the center of the search region plus a value equal to a calculated average noise intensity of the image.

In some embodiments, the search region may be centered at an estimated location of the centroid. An estimated location may be calculated using the pitch of the lenslet array or can be determined using any known or yet to be developed technique for determining a centroid location.

In some embodiments, after identification of a first pixel (from which the search begins) having a first intensity value, an upper threshold intensity value $T_U$ that is greater than the first intensity value is calculated. For example, the upper threshold may be equal to the first intensity value plus a value equal to the average noise intensity of the image.

In some embodiments, a lower threshold intensity value $T_L$ that is less than the first intensity value is also calculated. However, a lower threshold is not necessary. For example, the lower threshold may be equal to the first intensity value minus a value equal to the average noise intensity present in the image.

After one or more threshold value(s) are calculated, the search region is searched for a second pixel having an intensity value that is greater than the upper threshold intensity value. In some embodiments, the search begins at the estimated location and proceeds in an outward spiral in a pixel-by-pixel manner. However, other search techniques may be used.

Figure 6A:
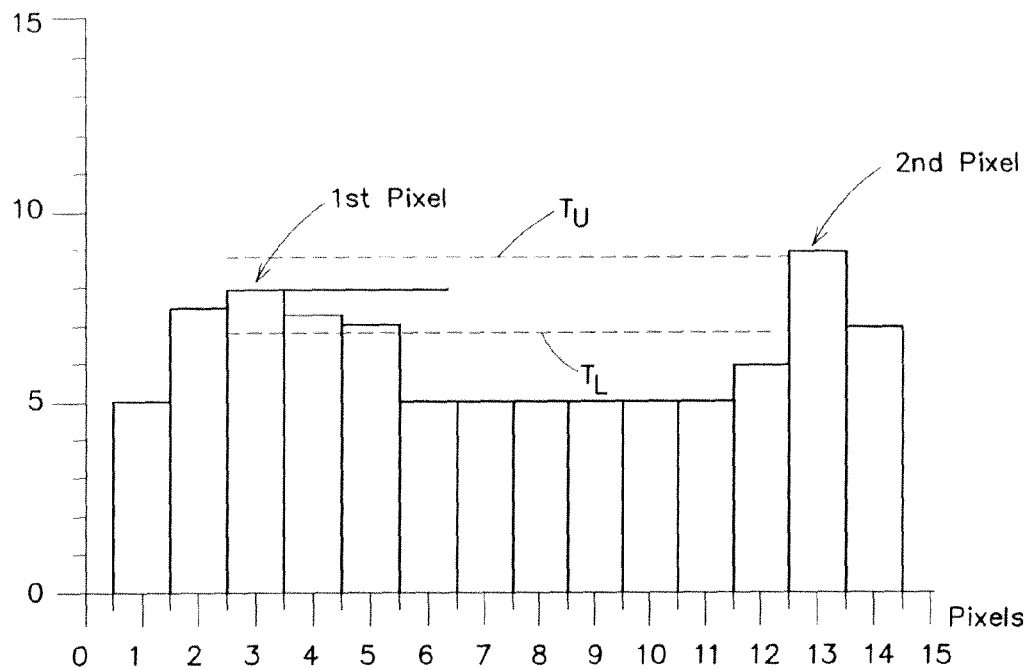
FIGS. 6A and 6B illustrate first and second pixels, and thresholds identified during centroid calculations.
Figure 6B:
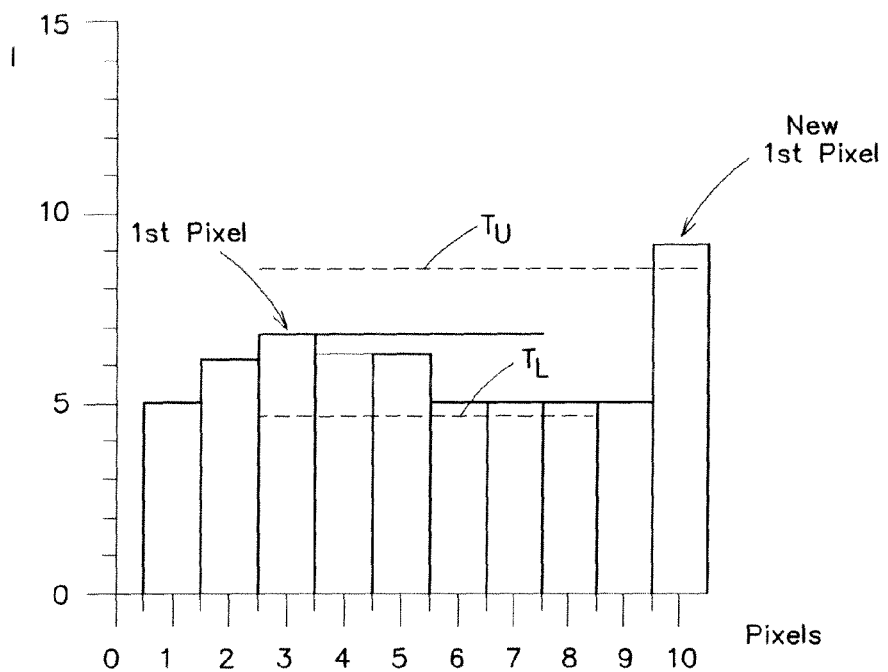

As shown in FIG. 6A and 6B, in embodiments where a lower threshold is calculated, if a second pixel having an intensity greater than the upper threshold $T_U$ is found, the intensity values between (e.g., linearly between) the first pixel and the second pixel are determined. As shown in FIG. 6A, if at least one intensity values between the first pixel and the second pixel is less than the lower threshold intensity value $T_L$, the first pixel is designated an integration region center. The radius of the integration region, r, is taken to be equal to a distance between the first pixel to the second pixel. In some embodiments, radius r is equal to the distance from the first pixel to the second pixel. In other embodiments, the second pixel is excluded.

As shown in FIG. 6B, if none of the intensity values between the first pixel and the second pixel is less than the lower threshold intensity value $T_L$, the second pixel is designated as the new first pixel and a new upper threshold $T_U'$ and lower threshold $T_L'$ are calculated (e.g., based on noise and the intensity of the new first pixel) and search proceeds about the new first pixel for a second pixel having an intensity greater than the new upper threshold.

In some embodiments, where only an upper threshold is calculated, if a second pixel having an intensity greater than the upper threshold $T_U$ is found, the first pixel is designated an integration region center, and the radius of the integration region, r, is taken to be equal to a distance between the first pixel to the second pixel. For example, it will be appreciated, that in the absence of noise (or if the noise is sufficiently low), it may be appropriate that the lower threshold be omitted and the search occurs for a second pixel having an intensity greater than the first intensity value.

Ultimately if, for a given first pixel, no pixel within the search region has an intensity value that is greater than the upper threshold intensity value, the boundary will be reached. The current first pixel is designated as the integration region center. The radius of the integration region is taken to be equal to the distance from the current first pixel to the search region boundary.

Figure 5:
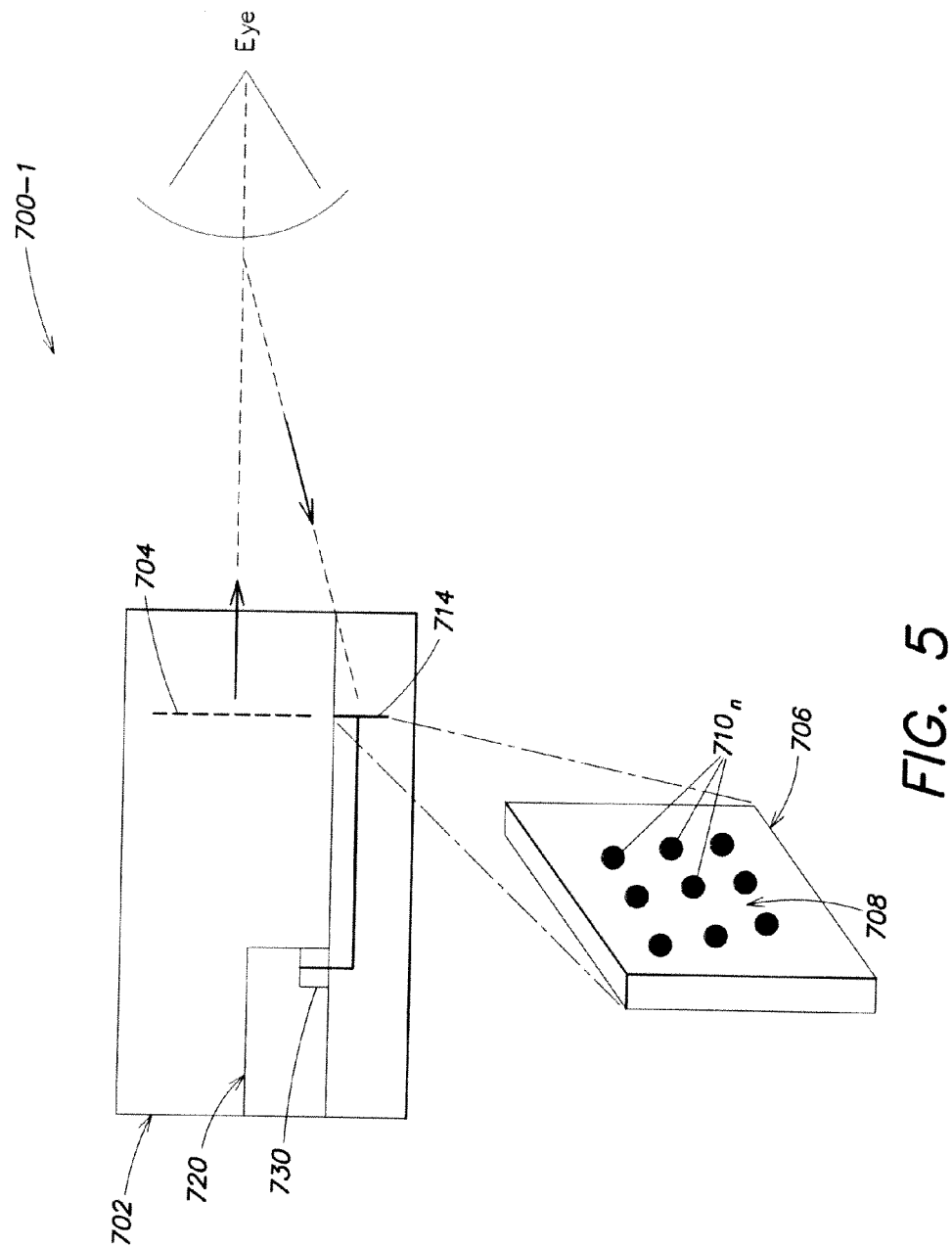
FIG. 5 is a schematic illustration of a system in support of several exemplary aspects of an embodiment of the invention.

Another embodiment of the invention is directed to an aberrometer system 700-1 for measuring an ocular aberration, as shown schematically in FIG. 5. The system includes an aberrometer 702 having a component 704 for forming an image 706 containing an array 708 of image spots $710_n$; a sensor 714 positioned to detect the image spot array 708; a processor component 720 that includes executable software which provides an operational instruction 730 for processing the image spot array.

Persons skilled in the art will recognize that the component 704 for forming an image containing an array of image spots may be a lenslet array as is typically utilized in a Shack-Hartmann wavefront sensor. Alternatively, the component 704 may be a suitable optical, electro-optical, MEMS, or other image spot array-forming component.

According to an exemplary aspect, the executable instruction 730 for processing the image spot array instructs the system to process images containing arrays of spots as set forth in one or more of the embodiments set forth above.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A method for determining a centroid coordinate of an image spot in a system for measuring an ocular aberration, comprising:
    a) determining a search region having a border;
    b) identifying a first pixel in the search region, the first pixel having a first intensity value;
    c) determining an upper threshold intensity value greater than the first intensity value;
    d) searching for a second pixel within the search region having an intensity value that is greater than the upper threshold intensity value;
    e) upon finding the second pixel, designating the first pixel an integration region center; and
    f) determining a lower threshold intensity value less than the first intensity value, and wherein step (e) is performed only if at least one intensity values between the first pixel and the second pixel is less than the lower threshold intensity value.

2. The method of claim 1, further comprising identifying a radius, r, of the integration region equal to a distance between the first pixel to the second pixel.

3. The method of claim 1, further comprising, provided that none of the intensity values between the first pixel and the second pixel is less than the lower threshold intensity value, designating the second pixel as the first pixel having a first intensity value and repeating steps (c)-(f).

4. The method of claim 1, provided that no pixel within the search region has an intensity value that is greater than the upper threshold intensity value, designating the first pixel an integration region center, and further comprising identifying a radius, r, of an integration region equal to the distance from the first pixel to the border.

5. The method of claim 1, wherein the search region is smaller than a distance between neighbor spots.

6. A system for measuring an ocular aberration, comprising:
    an aberrometer including a lenslet component for forming an image containing an array of image spots;
    a sensor positioned to detect the image spot array;
    a processor component including executable software that provides an instruction for determining a centroid coordinate of each of said image spots, wherein the instruction comprises:
    a) determining a search region having a border;
    b) identifying a first pixel in the search region, the first pixel having a first intensity value;
    c) determining an upper threshold intensity value greater than the first intensity value;
    d) searching for a second pixel within the search region having an intensity value that is greater than the upper threshold intensity value; and
    e) upon finding the second pixel, designating the first pixel an integration region center; and f) determining a lower threshold intensity value less than the first intensity value, and wherein step (e) is performed only if at least one intensity values between the first pixel and the second pixel is less than the lower threshold intensity value.

7. The system of claim 6, wherein the instruction further comprises identifying a radius, r, of an integration region equal to a distance between the first pixel to the second pixel.

8. The system of claim 6, wherein the instruction is adapted such that, provided that none of the intensity values between the first pixel and the second pixel is less than the lower threshold intensity value, designating the second pixel as the first pixel and repeating steps (b)-(f).

* * * * *